US012554213B2

(12) United States Patent
Nakagawa et al.

(10) Patent No.: US 12,554,213 B2
(45) Date of Patent: Feb. 17, 2026

(54) DEVELOPING DEVICE INCLUDING TONER CONCENTRATION SENSOR THAT DETECTS TONER CONCENTRATION IN DEVELOPER AND IMAGE FORMING APPARATUS

(71) Applicant: KYOCERA Document Solutions Inc., Osaka (JP)

(72) Inventors: Junichi Nakagawa, Osaka (JP); Yuji Toyota, Osaka (JP); Takeru Nagamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/965,690

(22) Filed: Dec. 2, 2024

(65) Prior Publication Data

US 2025/0189910 A1 Jun. 12, 2025

(30) Foreign Application Priority Data

Dec. 6, 2023 (JP) ................................ 2023-206113

(51) Int. Cl.
*G03G 15/08* (2006.01)
*G03G 15/095* (2006.01)

(52) U.S. Cl.
CPC ..... *G03G 15/0891* (2013.01); *G03G 15/0849* (2013.01); *G03G 15/0851* (2013.01); (Continued)

(58) Field of Classification Search
CPC ........... G03G 15/0891; G03G 15/0849; G03G 15/095; G03G 15/0851; G03G 15/0853; G03G 15/0855; G03G 2215/0833
See application file for complete search history.

(56) References Cited

U.S. PATENT DOCUMENTS

2001/0053293 A1* 12/2001 Miyamura ......... G03G 15/0893 399/30
2002/0159781 A1 10/2002 Hatori ............................. 399/30
(Continued)

FOREIGN PATENT DOCUMENTS

JP 4462780 B2 2/2010
JP 2015-108761 A 6/2015
(Continued)

OTHER PUBLICATIONS

Extended European Search Report mailed May 7, 2025, issued to European Application No. 24216972.0.

*Primary Examiner* — Joseph S Wong
(74) *Attorney, Agent, or Firm* — Stein IP, LLC

(57) ABSTRACT

A developing device includes a development container, a first conveyance member, a second conveyance member, a developer carrier, and a toner concentration sensor. The first conveyance member and the second conveyance member are rotatably supported in the development container, and convey the developer, while stirring the developer, in mutually opposite directions along a longitudinal direction of the development container. The first conveyance member includes a rotation shaft and a first conveyance blade helically formed on an outer circumferential part of the rotation shaft. The first conveyance blade includes a cutout portion formed by removing part of the first conveyance blade in a facing region with respect to the toner concentration sensor.

5 Claims, 5 Drawing Sheets

(52) U.S. Cl.
CPC ..... *G03G 15/0853* (2013.01); *G03G 15/0855* (2013.01); *G03G 15/095* (2013.01); *G03G 2215/0833* (2013.01)

(56) References Cited

U.S. PATENT DOCUMENTS

| | | | | |
|---|---|---|---|---|
| 2014/0270817 | A1* | 9/2014 | Ikebata | G03G 15/0849<br>399/30 |
| 2017/0255129 | A1 | 9/2017 | Suzuki | G06G 15/0891 |
| 2018/0253033 | A1* | 9/2018 | Fujishima | G03G 15/0865 |
| 2020/0033759 | A1 | 1/2020 | Sako et al. | G03G 15/0891 |
| 2022/0155709 | A1 | 5/2022 | Shigehiro | G03G 15/0891 |

FOREIGN PATENT DOCUMENTS

| | | | |
|---|---|---|---|
| JP | 2022-080328 | A | 5/2022 |
| JP | 2022-097144 | A | 6/2022 |
| JP | 7229805 | B2 | 2/2023 |

* cited by examiner

DEVELOPING DEVICE INCLUDING TONER CONCENTRATION SENSOR THAT DETECTS TONER CONCENTRATION IN DEVELOPER AND IMAGE FORMING APPARATUS

INCORPORATION BY REFERENCE

This application is based on and claims the benefit of priority from Japanese Patent Application No. 2023-206113 filed on Dec. 6, 2023, the contents of which are hereby incorporated by reference.

BACKGROUND

The present disclosure relates to a developing device and an image forming apparatus.

In electrophotographic image forming apparatuses, such as electrophotographic copiers and printers, there is widely used a device that develops an electrostatic latent image formed on an outer circumferential surface of an image carrier, such as a photosensitive drum, by supplying toner to the electrostatic latent image, thereby forming a toner image, which will then be transferred onto a sheet. An image forming apparatus continuously forms uniform images by conveying a developer stored in a development container while stirring the developer, which includes toner, inside the development container. Further, to achieve appropriate image formation, the development container is provided with a toner concentration sensor that detects toner concentration inside the development container.

SUMMARY

According to one aspect of the present disclosure, a developing device includes a development container, a first conveyance member, a second conveyance member, a developer carrier, and a toner concentration sensor. The development container includes a first conveyance chamber and a second conveyance chamber arranged parallel to each other and mutually communicate at opposite end parts thereof in a longitudinal direction of the development container, and the development container contains a two-component developer that includes a toner to be supplied to an image carrier. The first conveyance member and the second conveyance member are rotatably supported in the first conveyance chamber and the second conveyance chamber, respectively, and convey the developer, while stirring the developer, in mutually opposite directions along the longitudinal direction of the development container. The developer carrier is rotatably supported in the development container so as to face the image carrier, and supplies the toner in the second conveyance chamber to the image carrier. The toner concentration sensor is disposed, on a wall of the development container along the longitudinal direction of the development container, so as to face the first conveyance member or the second conveyance member, and detects toner concentration in the developer. The first conveyance member and the second conveyance member each include a rotation shaft extending along the longitudinal direction of the development container, and a conveyance blade helically formed on an outer circumferential part of the rotation shaft. The conveyance blade includes a cutout portion formed by removing part of the conveyance blade in a facing region with respect to the toner concentration sensor.

DETAILED DESCRIPTION

Embodiments of the present disclosure will be described below with reference to the accompanying drawings. It should be understood, however, that the present disclosure is not limited to what is specifically described below.

Figure 1:
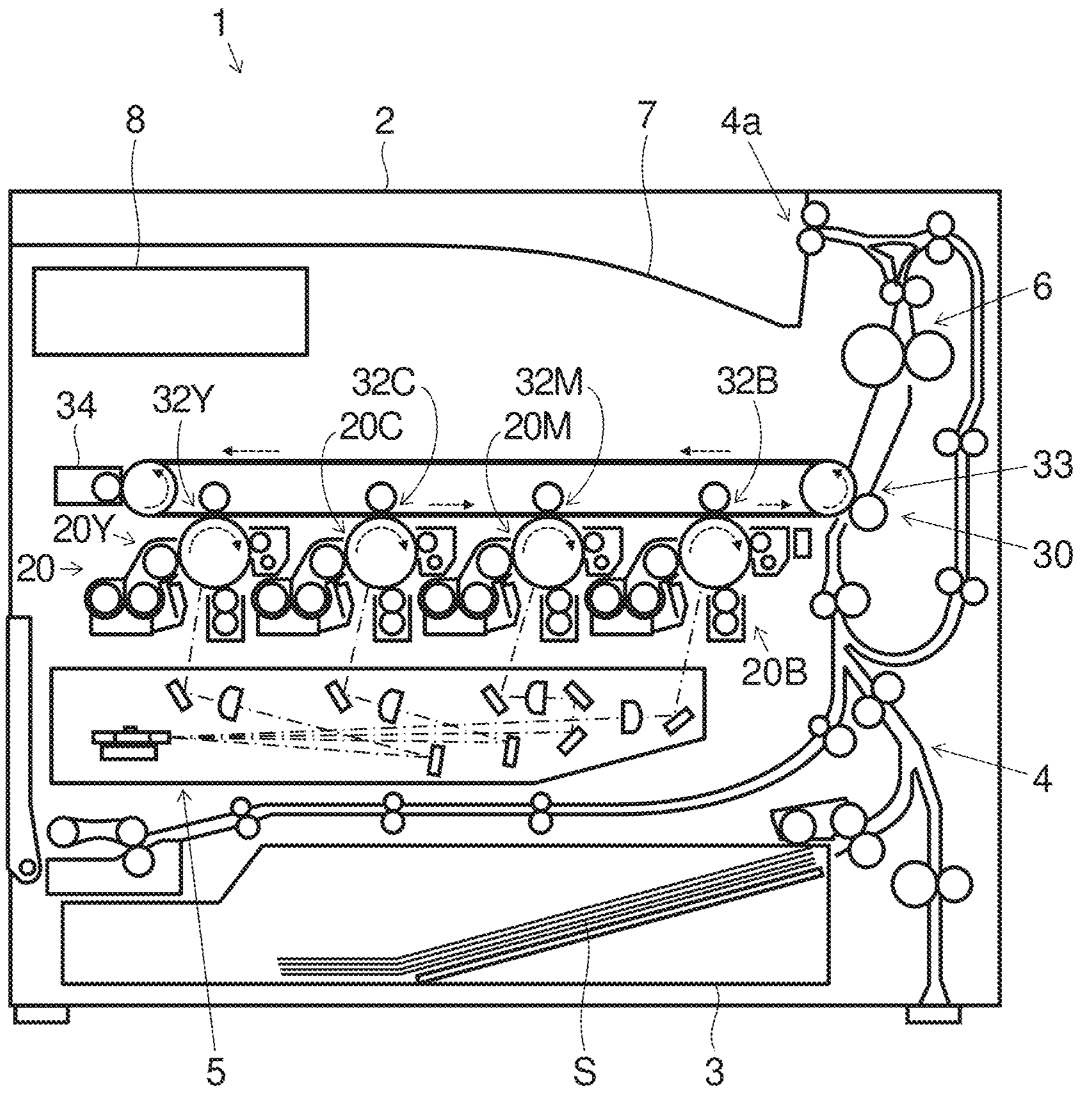
FIG. 1 is a schematic sectional front view of an image forming apparatus according to an embodiment of the present disclosure.
Figure 2:
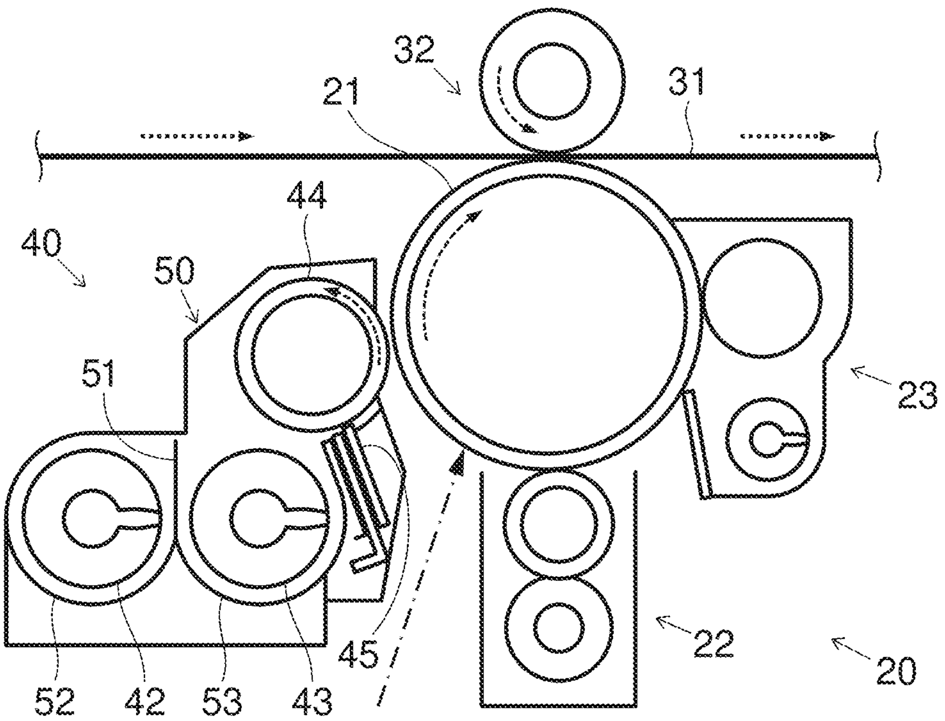
FIG. 2 is a schematic sectional front view of and around an image forming portion of the image forming apparatus shown in FIG. 1.

FIG. 1 is a schematic sectional front view of an image forming apparatus 1 according to an embodiment. FIG. 2 is a schematic sectional front view of and around an image forming portion 20 of the image forming apparatus 1 shown in FIG. 1. One example of the image forming apparatus 1 according to the present embodiment is a tandem-type color printer that transfers a toner image onto a sheet S using an intermediate transfer belt 31. The image forming apparatus 1 may be what is called a multifunction peripheral that is provided with functions of printing, scanning (image reading), facsimile transmission and reception, etc., for example.

As shown in FIG. 1 and FIG. 2, the image forming apparatus 1 includes, in a main body 2 thereof, a sheet feeding portion 3, a sheet conveying portion 4, an exposure portion 5, the image forming portion 20, a transfer portion 30, a fixing portion 6, a sheet discharging portion 7, and a control portion 8.

The sheet feeding portion 3 is disposed at a bottom part of the main body 2. The sheet feeding portion 3 contains a plurality of sheets S before printing, and feeds them out separately one by one during printing. The sheet conveying portion 4 extends in an up-down direction along a side wall of the main body 2. The sheet conveying portion 4 conveys a sheet S fed out from the sheet feeding portion 3 to a secondary transfer portion 33 and then to the fixing portion 6, and further discharges the sheet S, having undergone fixing, through a sheet discharging port 4*a* to the sheet discharging portion 7. The exposure portion 5 is disposed above the sheet feeding portion 3. The exposure portion 5 irradiates the image forming portion 20 with laser light that is controlled based on image data.

The image forming portion 20 is disposed above the exposure portion 5 but below the intermediate transfer belt 31. The image forming portion 20 includes an image forming portion 20Y for yellow, an image forming portion 20C for cyan, an image forming portion 20M for magenta, and an image forming portion 20B for black. These four image forming portions 20 are similar to each other in basic configuration. Thus, hereinafter, the color identification symbols “Y”, “C”, “M”, and “B” provided for distinction among the different colors may sometimes be omitted unless specific distinction is necessary.

The image forming portion 20 includes a photosensitive drum (an image carrier) 21 that is supported to be rotatable in a predetermined direction (clockwise in FIGS. 1 and 2). The image forming portion 20 further includes a charging portion 22, a developing device 40, and a drum cleaning portion 23 arranged around the photosensitive drum 21 along a rotation direction thereof. Between the developing device 40 and the drum cleaning portion 23, a primary transfer portion 32 is arranged.

The photosensitive drum 21 is formed in a cylindrical shape that extends in a horizontal direction, and has a photosensitive layer formed of, for example, an amorphous-silicon photoreceptor on an outer circumferential surface thereof. The charging portion 22 charges a surface (the outer circumferential surface) of the photosensitive drum 21 to a predetermined potential. The exposure portion 5 exposes, to light, the outer circumferential surface of the photosensitive drum 21 having been charged by the charging portion 22, and thereby forms an electrostatic latent image of a document image on the outer circumferential surface of the photosensitive drum 21. The developing device 40 supplies toner onto the electrostatic latent image to develop it, and thereby forms a toner image. The four image forming portions 20 each form the toner image in a corresponding one of the different colors. The drum cleaning portion 23, after the toner image is primarily transferred onto an outer circumferential surface of the intermediate transfer belt 31, performs cleaning by removing toner and the like remaining on the outer circumferential surface of the photosensitive drum 21. In this manner, the image forming portions 20 form images (toner images) to be later transferred to a sheet S.

The transfer portion 30 includes the intermediate transfer belt 31, primary transfer portions 32Y, 32C, 32M, and 32B, a secondary transfer portion 33, and a belt cleaning portion 34. The intermediate transfer belt 31 is disposed above the four image forming portions 20. The intermediate transfer belt 31 is an endless intermediate transfer member that is supported to be rotatable in a predetermined direction (a counterclockwise direction in FIG. 1), and onto which the toner images formed in the four image forming portions 20 are primarily transferred to be superimposed one on another. The four image forming portions 20 are arranged in what is called a tandem-type arrangement, that is, they are aligned from an upstream side toward a downstream side in a rotation direction of the intermediate transfer belt 31.

The primary transfer portions 32Y, 32C, 32M, and 32B are respectively arranged above the image forming portions 20Y, 20C, 20M, and 20B of the different colors, with the intermediate transfer belt 31 therebetween. The secondary transfer portion 33 is disposed upstream of the fixing portion 6 with respect to a sheet conveying direction of the sheet conveying portion 4 but downstream of the four image forming portions 20Y, 20C, 20M, and 20B with respect to the rotation direction of the intermediate transfer belt 31. The belt cleaning portion 34 is disposed downstream of the secondary transfer portion 33 with respect to the rotation direction of the intermediate transfer belt 31.

The primary transfer portion 32 transfers a toner image formed on the outer circumferential surface of the photosensitive drum 21 onto the intermediate transfer belt 31. In other words, at the primary transfer portions 32Y, 32C, 32M, and 32B of the different colors, toner images are primarily transferred onto the outer circumferential surface of the intermediate transfer belt 31. Further, along with rotation of the intermediate transfer belt 31, at predetermined timings, the toner images of the four image forming portions 20 are transferred successively onto the intermediate transfer belt 31 to be superimposed one on another, and thereby, on the outer circumferential surface of the intermediate transfer belt 31, a color toner image is formed in which toner images of the four colors, namely, yellow, cyan, magenta, and black, are superimposed one on another.

The color toner image on the outer circumferential surface of the intermediate transfer belt 31 is transferred onto a sheet S, having been synchronously conveyed by the sheet conveying portion 4, at a secondary transfer nip portion formed in the secondary transfer portion 33. The belt cleaning portion 34 performs cleaning by removing deposits such as residual toner and the like from the outer circumferential surface of the intermediate transfer belt 31 after the secondary transfer. In this manner, the transfer portion 30 transfers (records) the toner image formed on the outer circumferential surface of the photosensitive drum 21 onto the sheet S.

The fixing portion 6 is disposed above the secondary transfer portion 33. The fixing portion 6 applies heat and pressure to the sheet S to which the toner image has been transferred, and thereby fixes the toner image on the sheet S.

The sheet discharging portion 7 is disposed above the transfer portion 30. The printed sheet S having the toner image fixed thereon is conveyed to the sheet discharging portion 7. From the sheet discharging portion 7, a printed sheet (printed matter) can be taken out from above.

The control portion 8 includes a CPU, an image processor, a storage, and other electronic circuits and electronic components (of which none is illustrated). The CPU controls operations of various components provided in the image forming apparatus 1 on the basis of a control program and control data stored in the storage, and thereby performs processing related to functions of the image forming apparatus 1. The sheet feeding portion 3, the sheet conveying portion 4, the exposure portion 5, the image forming portion 20, the transfer portion 30, and the fixing portion 6 each individually receive a command from the control portion 8, and cooperate with each other to perform printing with respect to a sheet S. The storage is composed of, for example, a combination of nonvolatile storage devices such as a program ROM (read only memory), a data ROM, etc., and a volatile storage device such as a RAM (random access memory).

Figure 3:
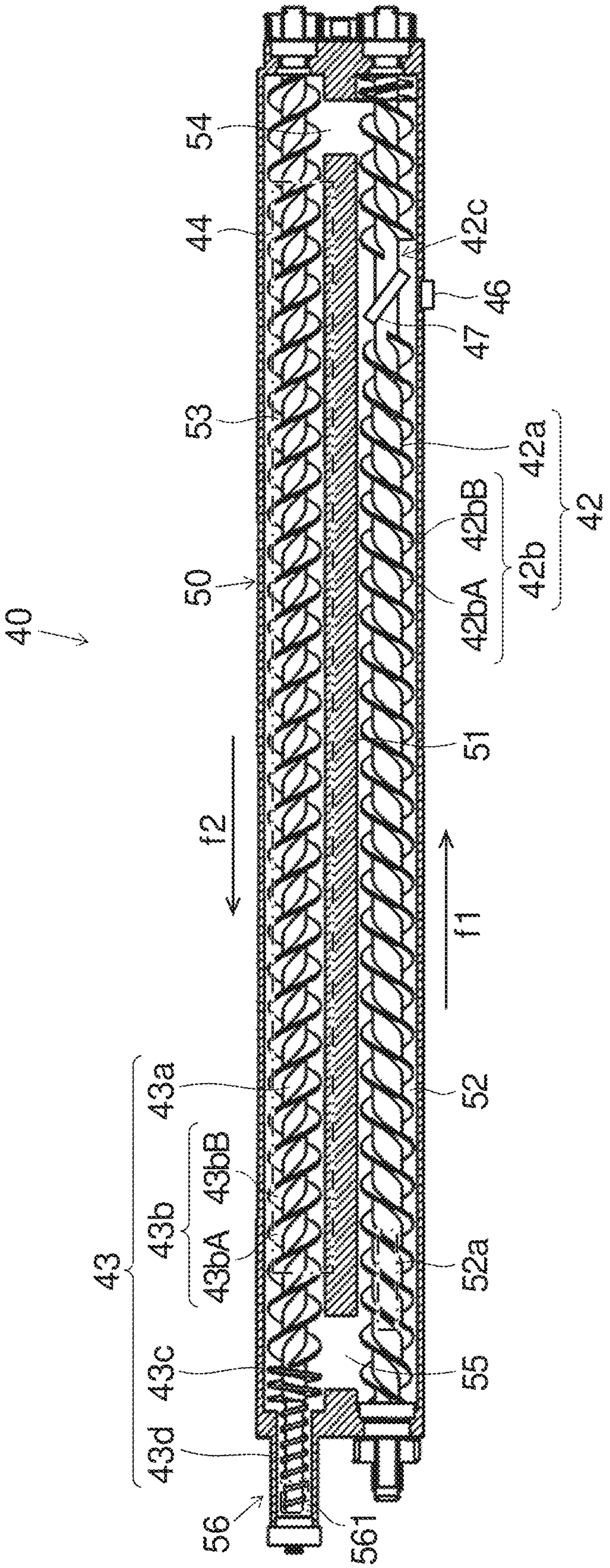
FIG. 3 is a horizontal sectional plan view of a developing device of the image forming portion shown in FIG. 2.

Described next is a configuration of the developing device 40, with reference to FIG. 3 in addition to FIG. 2. FIG. 3 is a horizontal sectional plan view of the developing device of the image forming portion shown in FIG. 2. Note that the developing devices 40 each corresponding to one of the different colors are similar to each other in basic configuration, and thus the identification symbols representing components' corresponding colors and overlapping descriptions will be omitted. In the descriptions herein, an "axis direction" refers to a rotational axis direction of each of the photosensitive drum 21, a first conveyance member 42, a second conveyance member 43, and a developing roller 44, of which all extend parallel to each other (a depth direction of the sheet on which FIG. 2 is drawn, a left-right lateral direction in FIG. 3).

The developing device 40 supplies the toner to the outer circumferential surface of the photosensitive drum 21. The developing device 40 is attachable and detachable with respect to the main body 2 of the image forming apparatus 1. The developing device 40 includes a development container 50, the first conveyance member 42, the second conveyance member 43, the developing roller (developer carrier) 44, a regulation blade 45, a toner concentration sensor 46, a scraper 47, and a holding portion 48.

The development container 50 has an elongated shape extending along an axis direction of the photosensitive drum 21, and is arranged with its longitudinal direction horizontal. That is, the longitudinal direction of the development container 50 is parallel to the axis direction of the photosensitive drum 21. The development container 50 contains, as a developer including a toner to be supplied to the photosensitive drum 21, a two-component developer that includes the toner and a magnetic carrier, for example.

The development container 50 includes a partition portion 51, a first conveyance chamber 52, a second conveyance chamber 53, a first communication portion 54, and a second communication portion 55.

The partition portion 51 is provided at a lower part in an inside the development container 50. The partition portion 51 is disposed substantially at a center part of the development container 50 in a direction intersecting with the longitudinal direction of the development container 50 (a left-right lateral direction in FIG. 2, an up-down direction in FIG. 3). The partition portion 51 is substantially plate-shaped, extending in the longitudinal direction and an up-down direction of the development container 50. The partition portion 51 divides the inside of the development container 50 in the direction intersecting with the longitudinal direction.

The first conveyance chamber 52 and the second conveyance chamber 53 are provided inside the development container 50. The first conveyance chamber 52 and the second conveyance chamber 53 are formed by dividing the inside of the development container 50 with the partition portion 51. The first conveyance chamber 52 and the second conveyance chamber 53 are disposed parallel to each other at approximately the same height.

The second conveyance chamber 53 includes a region around where the developing roller 44 is disposed inside the development container 50, and is disposed adjacent to the photosensitive drum 21. The first conveyance chamber 52 is disposed in a region, inside the development container 50, that is more away from the photosensitive drum 21 than the second conveyance chamber 53 is. The first conveyance chamber 52 has a developer replenishing port 52*a* opened therein, and through the developer replenishing port 52*a*, the development container 50 is replenished with the developer. In the first conveyance chamber 52, the developer is conveyed by the first conveyance member 42 in a first direction f1. In the second conveyance chamber 53, the developer is conveyed by the second conveyance member 43 in a second direction f2, which is opposite to the first direction f1.

The first communication portion 54 and the second communication portion 55 are respectively disposed on outsides of opposite end portions of the partition portion 51 in its longitudinal direction. The first communication portion 54 and the second communication portion 55 allow the first conveyance chamber 52 and the second conveyance chamber 53 to communicate with each other in the direction intersecting with the longitudinal direction of the partition portion 51 (the left-right lateral direction in FIG. 2, the up-down direction in FIG. 3), that is, in a thickness direction of the partition portion 51, which is substantially plate-shaped. In other words, the first communication portion 54 and the second communication portion 55 allow the first conveyance chamber 52 and the second conveyance chamber 53 to communicate with each other on sides of their opposite end parts in their longitudinal directions.

The first communication portion 54 allows communication between a downstream end of the first conveyance chamber 52 in the first direction f1 and an upstream end of the second conveyance chamber 53 in the second direction f2. Through the first communication portion 54, the developer is conveyed from the first conveyance chamber 52 side toward the second conveyance chamber 53 side. The second communication portion 55 allows communication between a downstream end of the second conveyance chamber 53 in the second direction f2 and an upstream end of the first conveyance chamber 52 in the first direction f1. Through the second communication portion 55, the developer is conveyed from the second conveyance chamber 53 side toward the first conveyance chamber 52 side.

The first conveyance member 42 is disposed inside the first conveyance chamber 52. The second conveyance member 43 is disposed inside the second conveyance chamber 53. The first conveyance member 42 and the second conveyance member 43 are arranged parallel to each other at approximately the same height. The second conveyance member 43 extends close and parallel to the developing roller 44. The first conveyance member 42 and the second conveyance member 43 are each supported in the development container 50 so as to be rotatable about an axis horizontally extending parallel to the developing roller 44.

The first conveyance member 42 and the second conveyance member 43 are similar to each other in basic configuration. The first conveyance member 42 includes a rotation shaft 42*a* extending along the longitudinal direction of the development container 50, and a first conveyance blade 42*b* helically formed on an outer circumferential part of the rotation shaft 42*a*. In the present embodiment, the first conveyance blade 42*b* is double-threaded with first conveyance blades 42*b*A and 42*b*B. The second conveyance member 43 includes a rotation shaft 43*a* extending along the longitudinal direction of the development container 50 and a second conveyance blade 43*b* helically formed on an outer circumferential part of the rotation shaft 43*a*. In the present embodiment, the second conveyance blade 43*b* is double-threaded with second conveyance blades 43*b*A and 43*b*B.

The first conveyance member 42, inside the first conveyance chamber 52, conveys the developer, while stirring the developer, in the first direction f1 directed from the second communication portion 55 toward the first communication portion 54 along the rotational axis direction of the first conveyance member 42. The second conveyance member 43, inside the second conveyance chamber 53, conveys the developer, while stirring the developer, in the second direction f2 directed from the first communication portion 54 toward the second communication portion 55 along the rotational axis direction of the second conveyance member 43. That is, the first conveyance member 42 and the second conveyance member 43 convey the developer, while stirring the developer, in mutually opposite directions in the longitudinal direction, and thereby circulate the developer in a predetermined circulation direction.

The developing roller 44, which is located inside the development container 50, is located above the second conveyance member 43 and arranged to face the photosensitive drum 21. The developing roller 44 is supported in the development container 50 to be rotatable about an axis extending parallel to the axis of the photosensitive drum 21.

The developing roller 44 has part of its outer circumference surface exposed out of the development container 50 to face, and be close to, the photosensitive drum 21. The developing roller 44 carries, on its outer circumferential surface, the toner to be supplied to the outer circumferential surface of the photosensitive drum 21 in a facing region with respect to the photosensitive drum 21. The developing roller 44 carries the toner inside the second conveyance chamber 53 of the development container 50, and supplies the toner to the photosensitive drum 21. In other words, the developing roller 44 causes the toner inside the second conveyance chamber 53 to adhere to an electrostatic latent image formed on the outer circumferential surface of the photosensitive drum 21, and thereby forms a toner image.

The regulation blade 45 is disposed upstream of the facing region between the developing roller 44 and the photosensitive drum 21 in the rotation direction of the developing roller 44. The regulation blade 45 is disposed close to, and facing, the developing roller 44 with a predetermined space between its leading edge and the outer circumferential surface of the developing roller 44. The regulation blade 45 extends over an entire area in the axis direction of the developing roller 44. The regulation blade 45 regulates layer thickness of the developer (toner) carried on the surface of the developing roller 44 when the developer passes through the space between the leading edge of the regulation blade 45 and the outer circumferential surface of the developing roller 44.

The toner concentration sensor 46 is disposed on a wall of the first conveyance chamber 52 along the longitudinal direction of the first conveyance chamber 52 (the first direction f1). The toner concentration sensor 46 is disposed so as to face the first conveyance member 42. In the present embodiment, a headless sensor is used as the toner concentration sensor 46. The toner concentration sensor 46, which is a headless sensor, has its sensing surface embedded in an inner wall surface of the first conveyance chamber 52. The toner concentration sensor 46 detects toner concentration in the developer.

More specifically, the toner concentration sensor 46 is a sensor of a type that detects magnetic permeability, and acquires a toner concentration (a mixture ratio of the toner T to the magnetic carrier C in the developer; T/C) by detecting a change of the magnetic permeability of a two-component developer. The magnetic permeability changes with the ratio of the toner to the magnetic carrier in the developer inside the first conveyance chamber 52, and in response to such changes, the toner concentration sensor 46 outputs different signals. The control portion 8, on the basis of an output signal received from the toner concentration sensor 46, controls start and stop of the replenishment of the developer (the toner and the carrier) with respect to the developing device 40.

In relation to the toner concentration sensor 46, the scraper 47 is attached to the first conveyance member 42. The scraper 47 is, in a facing region with respect to the toner concentration sensor 46, secured to the rotation shaft 42*a* of the first conveyance member 42 via the holding portion 48. Details will be given later of the scraper 47.

The developer inside the development container 50 is caused by rotations of the first conveyance member 42 and the second conveyance member 43 to circulate, through the first communication portion 54 and the second communication portion 55, between the first conveyance chamber 52 and the second conveyance chamber 53 in the predetermined circulation direction. At this time, the toner in the development container 50 is stirred to be charged, and then carried on the outer circumference surface of the developing roller 44. The developer carried on the outer circumference surface of the developing roller 44 has its layer thickness regulated by the regulation blade 45, and is then conveyed, by the rotation of the developing roller 44, to the facing region between the developing roller 44 and the photosensitive drum 21. When a predetermined developing voltage is applied to the developing roller 44, due to a potential difference between the developing roller 44 and the surface (outer circumference surface) of the photosensitive drum 21, the toner in the developer carried on the outer circumference surface of the developing roller 44 moves onto the outer circumference surface of the photosensitive drum 21 in the facing region. Thereby, the electrostatic latent image on the outer circumferential surface of the photosensitive drum 21 is developed with the toner.

The development container 50 further includes a discharge portion 56. The discharge portion 56 is disposed downstream of a downstream end of the second conveyance chamber 53 in the second direction f2. The discharge portion 56 is connected to the second conveyance chamber 53. Insides of the discharge portion 56 and the second conveyance chamber 53 communicate with each other. The discharge portion 56 has a smaller inner diameter than the second conveyance chamber 53. The discharge portion 56 has a developer discharging port 561.

Note that the rotation shaft 43*a* of the second conveyance member 43 extends continuously into the discharge portion 56. One end of the rotation shaft 43*a* in the axis direction is rotatably supported by the development container 50 at a downstream end of the discharge portion 56 with respect to the second direction f2 of the second conveyance chamber 53.

The developer discharging port 561 is disposed at the downstream end of the discharge portion 56 with respect to the second direction f2 of the second conveyance chamber 53. The developer discharging port 561 is an opening located below the rotation shaft 43*a* of the second conveyance member 43, for example. The developer discharging port 561 allows an excess amount of the developer to be discharged therethrough out of the development container 50.

The second conveyance member 43 further includes, in addition to the second conveyance blade 43*b*, a regulation blade 43*c* and a discharge blade 43*d*. These three blades are arranged, in a direction from the second conveyance chamber 53 side toward the discharge portion 56 side, in order of the second conveyance blade 43*b*, the regulation blade 43*c*, and the discharge blade 43*d*. The regulation blade 43*c* and the discharge blade 43*d*, as well as the second conveyance blade 43*b*, are each integrally formed on the outer circumferential surface of the rotation shaft 43*a* in a helical shape along the axis direction the rotation shaft 43*a*.

The regulation blade 43*c* is located downstream of the second conveyance blade 43*b* with respect to the second direction f2 of the second conveyance chamber 53, and is disposed inside the second conveyance chamber 53. The regulation blade 43*c* faces, in the axis direction of the rotation shaft 43*a*, a connection part where the second conveyance chamber 53 and the discharge portion 56 are connected to each other.

The regulation blade 43*c* is wound in a direction opposite to the second conveyance blade 43*b*. Thereby, the regulation blade 43*c* holds back the developer having been conveyed close to the downstream end inside the second conveyance chamber 53, and restricts movement of the developer toward the discharge portion 56. Note that the regulation blade 43*c* has a smaller pitch than the second conveyance blade 43*b*.

There is a predetermined clearance between an outer circumferential part of the regulation blade 43*c* and an inner surface of the development container 50. When the amount of the developer in the second conveyance chamber 53 exceeds a predetermined amount, the excess amount of the developer is conveyed through the clearance between the outer circumference part of the regulation blade 43*c* and the inner surface of the development container 50 toward the discharge portion 56.

The discharge blade 43*d* is located downstream of the regulation blade 43*c* with respect to the second direction f2 of the second conveyance chamber 53, and is disposed inside the discharge portion 56. The discharge blade 43*d* is wound in the same direction as the second conveyance blade 43*b*. That is, the developer is conveyed inside the discharge portion 56 in a direction same as the second direction f2 of the second conveyance chamber 53. Thereby, the discharge blade 43*d* conveys the excess amount of the developer inside the discharge portion 56 toward the developer discharging port 561. Note that the discharge blade 43*d* has a smaller outer diameter than the second conveyance blade 43*b* and the regulation blade 43*c*. The discharge blade 43*d* has a smaller pitch than the second conveyance blade 43*b*.

Figure 4:
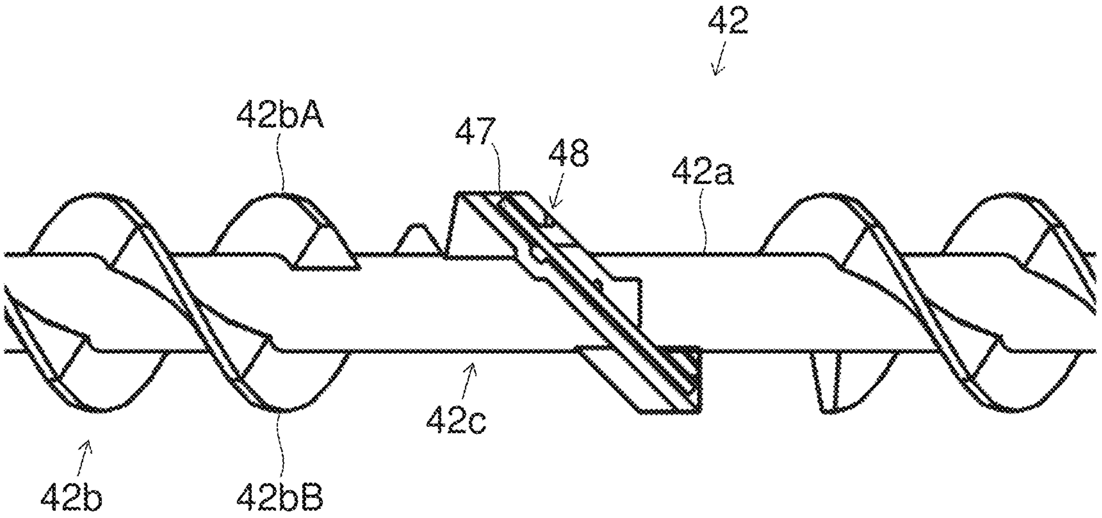
FIG. 4 is a partial side view of a first conveyance member of the developing device shown in FIG. 3.
Figure 5:
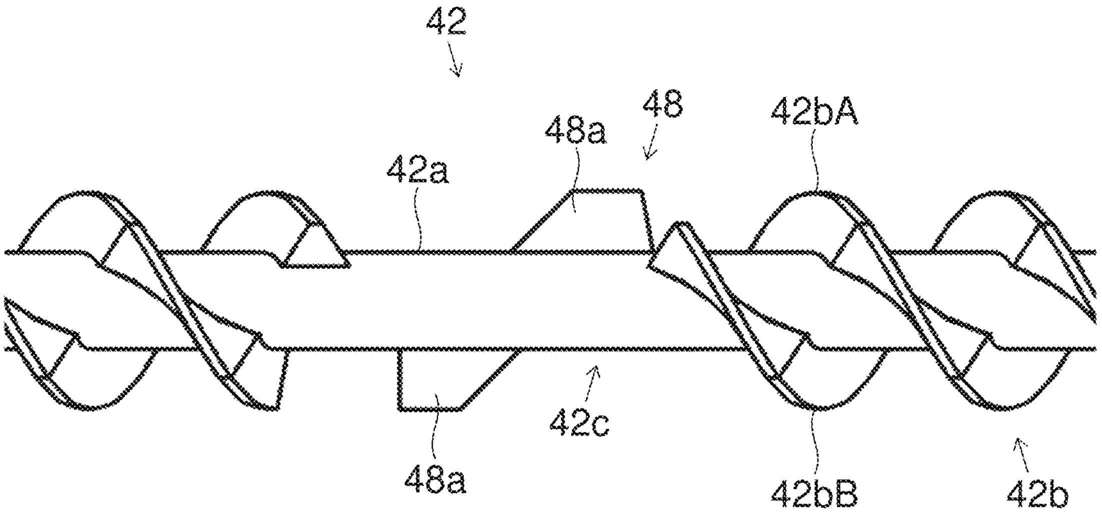
FIG. 5 is a partial side view of the first conveyance member as seen from a side opposite to the side in FIG. 4.
Figure 6:
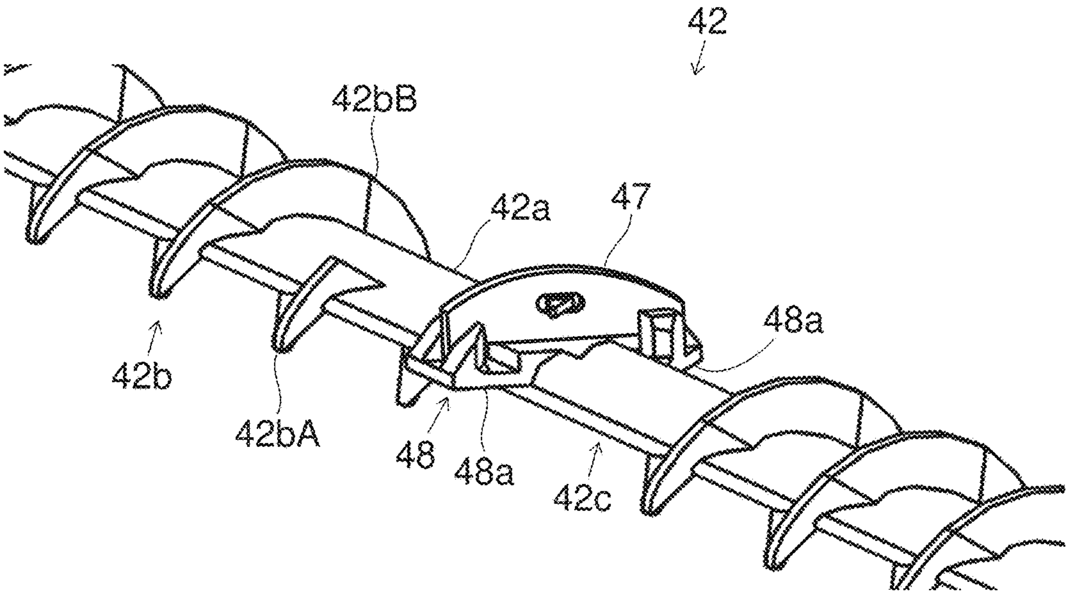
FIG. 6 is a partial perspective view of the first conveyance member shown in FIG. 4.

Next, the configuration of the developing device 40 will be described in more detail with reference to FIGS. 4, 5, and 6, in addition to FIG. 3. FIG. 4 is a partial side view of the first conveyance member 42 of the developing device 40 shown in FIG. 3. FIG. 5 is a partial side view of the first conveyance member 42 as seen from a side opposite to the side in FIG. 4. FIG. 6 is a partial perspective view of the first conveyance member 42 shown in FIG. 4.

As shown in FIGS. 4, 5, and 6, the first conveyance member 42 has a cutout portion 42*c*. As shown in FIG. 3, the cutout portion 42*c* is formed in a facing region with respect to the toner concentration sensor 46. In the cutout portion 42*c* located in the facing region with respect to the toner concentration sensor 46, part of the first conveyance blade 42*b* is removed along the longitudinal direction (the first direction f1). Note that, in the present embodiment, in the cutout portion 42*c*, the first conveyance blades 42*b*A and 42*b*B are partly removed respectively by different amounts in the axis direction of the rotation shaft 42*a* (left-right lateral direction in FIGS. 4 and 5).

According to the configuration described above, with the first conveyance blade 42*b* having the cutout portion 42*c* in the facing region with respect to the toner concentration sensor 46, even if the developer is conveyed at an increased speed, the developer becomes more likely to accumulate in the vicinity of the toner concentration sensor 46. This helps stabilize detected values of toner concentration, making it possible to maintain an appropriate amount of toner in the development container 50.

The scraper 47 is secured, in the cutout portion 42*c*, to the rotation shaft 42*a* of the first conveyance member 42 via the holding portion 48. As shown in FIG. 6, the scraper 47 is formed in a fan shape as seen from the axis direction of the rotation shaft 42*a*. The scraper 47 is disposed in a manner inclined with respect to the axis direction of the rotation shaft 42*a* at substantially the same angle as the first conveyance blade 42*b*, which is helical.

Used as the scraper 47 is, for example, a member obtained by laying a fiber sheet such as a felt sheet, a nonwoven cloth sheet, or the like on a surface of a base material constituted of a flexible film (elastic member) such as a PET (Polyethylene Terephthalate) film. The scraper 47 rotates together with the rotation shaft 42*a*, and thereby moves the developer facing the toner concentration sensor 46. Then, a fresh portion of the developer is sent to the facing region with respect to the toner concentration sensor 46.

According to the configuration described above, the provision of the scraper 47 in the cutout portion 42*c* makes it possible to prevent excessive accumulation of the developer in the vicinity of the toner concentration sensor 46. Thus, it becomes possible to appropriately detect a toner concentration inside the development container 50.

The holding portion 48 is integrally formed with the outer circumferential part of the rotation shaft 42*a* in the cutout portion 42*c*. Note that, although the holding portion 48 is integrally formed with the rotation shaft 42*a* in the present embodiment, the holding portion 48 may instead be provided as a separate member with respect to the rotation shaft 42*a*. The holding portion 48 holds the scraper 47 by pinching it substantially in the axial direction of the rotation shaft 42*a*.

The holding portion 48 has a peripheral end surface 48*a* extending in a radial direction of the rotation shaft 42*a* at opposite end parts of the rotation shaft 42*a* in a circumferential direction thereof. As shown in FIG. 5, the peripheral end surface 48*a* faces in a direction substantially orthogonal to the axis direction of the rotation shaft 42*a*. The peripheral end surface 48*a* of the holding portion 48 is disposed on an edge of the cutout portion 42*c* in a circumferential direction thereof.

According to the configuration described above, with the holding portion 48 for holding the scraper 47 having the peripheral end surface 48*a*, the peripheral end surface 48*a*, which moves along with rotation of the rotation shaft 42*a*, helps enhance the effect of moving the developer in the vicinity of the toner concentration sensor 46. This makes it possible to suppress excessive accumulation of the developer in the vicinity of the toner concentration sensor 46. Thus, it becomes possible to appropriately detect a toner concentration inside the development container 50.

Figure 7:
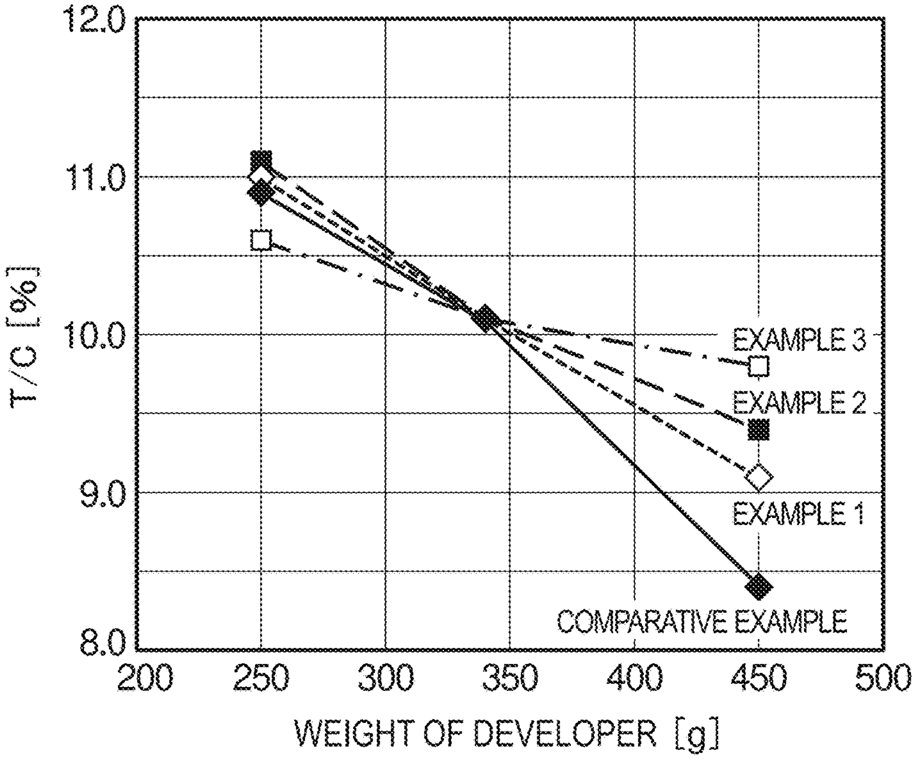
FIG. 7 is a graph showing how the mixing ratio of toner to carrier (T/C) in a developer changes in each of developing devices of various examples and a comparative example.

Next, advantageous effects of the present embodiment will be described. FIG. 7 is a graph showing how the mixing ratio of toner to carrier (T/C) in the developer changes in each of developing devices of examples and a comparative example. Assessments were conducted on the developing devices 40 of the examples and the developing device of the comparative example to evaluate how the presence/absence of the cutout portion 42*c* and the length of the cutout portion 42*c* in the axial direction would affect the toner concentration in the developer (which may also be described as the mixing ratio of toner to carrier (T/C) in the developer).

In the developing device of the comparative example, the first conveyance blade had no cutout portion formed in the facing region with respect to the toner concentration sensor. The developing device 40 of Example 1 had the cutout portion 42*c* formed in one of the first conveyance blades 42*b*A and 42*b*B in the facing region with respect to the toner concentration sensor 46. While the toner concentration sensor 46 had a length L in the axis direction, the cutout portion 42*c* of Example 1 had a length (3 L) in the axis direction three times the length L. In the developing devices 40 of Examples 2 and 3, in both of the first conveyance blades 42*b*A and 42*b*B, the cutout portion 42*c* was formed in the facing region with respect to the toner concentration sensor 46. While the toner concentration sensor 46 had the length L in the axis direction, the cutout portion 42*c* of Example 2 had a length (1.5 L) in the axis direction 1.5 times the length L, and the cutout portion 42*c* of Example 3 had a length (3 L) in the axis direction 3 times the length L. The configuration conditions of the cutout portions 42*c* and the evaluation results are shown in Table 1.

TABLE 1

| | Cutout Portion Length (L: Sensor Length) | | Evaluation of |
|---|---|---|---|
| | Conveyance Blade 42bA | Conveyance Blade 42bB | Variability of T/C |
| Comparative Example | None | None | Poor |
| Example 1 | 3 L | None | Fair |
| Example 2 | 1.5 L | 1.5 L | Good |
| Example 3 | 3 L | 3 L | Excellent |

As shown in FIG. 7 and Table 1, the variability of T/C was evaluated by assessing variation in T/C between cases where the weight of the developer was 250 g, which was the initial value, and where the weight of the developer was increased approximately by 100 g (340 g, 450 g). As for "Evaluation of Variability of T/C" in Table 1, configurations in which variation in T/C was constrained within 1% were classified as "Excellent", "Good", and "Fair" in order from the smallest to the largest in variation range. A configuration in which variation in T/C exceeded 1% was classified as "Poor".

According to FIG. 7 and Table 1, in all the four configurations, variations of T/C were constrained within 1% when the weight of the developer was increased from 250 g to 340 g. However, in the developing device of the comparative example, T/C varied by far more than 1% when the weight of the developer was increased from 340 g to 450 g. In contrast, in the developing devices 40 of Examples 1, 2, and 3, even when the weight of the developer was increased from 340 g to 450 g, variations of T/C were all constrained within 1%. Among them, Example 3 exerts the highest effect in constraining T/C variation.

Further, according to the configuration of Example 1, by forming the cutout portion 42*c* in at least one of the first conveyance blades 42*b*A and 42*b*B, T/C variation can be constrained within 1%. That is, it is possible to stabilize detected values of toner concentration (T/C), and thus to maintain an appropriate amount of toner in the development container 50.

According to the configuration of Example 2, by forming the cutout portion 42*c* with a length that is equal to or greater than 1.5 times the length of the toner concentration sensor 46 in the longitudinal direction (the axis direction) of the development container 50, T/C variation can be constrained within 1%. That is, it is possible to stabilize detected values of toner concentration (T/C), and thus to maintain an appropriate amount of toner in the development container 50.

Further, the developing device 40 forms toner images using a two-component developer including a magnetic carrier and a toner, and has the developer discharging port 561 through which an excess amount of the developer is discharged outside. It is known that provision of the developer discharging port 561 in the developing device 40 facilitates the movement of developer inside a development container 50. Thus, in the developing device 40 having the developer discharging port 561, by forming the cutout portion 42*c* in the first conveyance blade 42*b*A as described above, it is possible to stabilize detected values of toner concentration (T/C). That is, in the developing devices 40, it is possible to more effectively maintain an appropriate toner amount in the development container 50.

The above-described embodiments are by no means meant to limit the scope of the present disclosure, and various modifications can be made and implemented within the scope not departing from the gist of the present disclosure.

For example, in the above embodiment, the image forming apparatus 1 is described as what is called a tandem-type image forming apparatus for color printing, which sequentially forms images of a plurality of colors one on top of another, but the image forming apparatus 1 is not limited to an image forming apparatus of such a type. The image forming apparatus may be a non-tandem type color image forming apparatus or a monochrome image forming apparatus.

What is claimed is:

1. A developing device, comprising:

a development container that includes a first conveyance chamber and a second conveyance chamber arranged parallel to each other and mutually communicating at opposite end parts thereof in a longitudinal direction of the development container, the development container containing a developer that includes a toner to be supplied to an image carrier;

a first conveyance member and a second conveyance member that are rotatably supported in the first conveyance chamber and the second conveyance chamber, respectively, and that convey the developer, while stirring the developer, in mutually opposite directions along the longitudinal direction of the development container;

a developer carrier that is rotatably supported in the development container so as to face the image carrier, and that supplies the toner in the second conveyance chamber to the image carrier; and a toner concentration sensor that is disposed, on a wall of the development container along the longitudinal direction thereof, so as to face the first conveyance member or the second conveyance member, and that detects toner concentration in the developer, wherein the first conveyance member and the second conveyance member each include a rotation shaft extending along the longitudinal direction of the development container, and a conveyance blade helically formed on an outer circumferential part of the rotation shaft, and the conveyance blade includes a cutout portion that is formed by removing part of the conveyance blade in a facing region with respect to the toner concentration sensor, the developing device further comprising:

a scraper that is secured to the rotation shaft in the cutoff portion, and that moves the developer facing the toner concentration sensor; and a holding portion that is formed on the rotation shaft in the cutoff portion, and that holds the scraper, and the holding portion has a peripheral end surface that extends in a radial direction of the rotation shaft at opposite ends of the rotation shaft in a circumferential direction thereof, and that is disposed at an edge of the cutout portion in a circumferential direction thereof.

2. The developing device according to claim 1, wherein the first conveyance member and the second conveyance member each include the conveyance blade that is multi-threaded, and the cutout portion is formed in at least one of the conveyance blades that are multi-threaded.

3. The developing device according to claim 1, wherein the cutout portion has a length that is equal to or greater than 1.5 times a length of the toner concentration sensor with respect to the longitudinal direction of the development container.

4. The developing device according to claim 1, wherein the developer is a two-component developer including a magnetic carrier and the toner, and the development container includes a developer replenishing port through which the development container is replenished with the developer, and a developer discharging port that is formed at a downstream end part of the second conveyance chamber with respect to a developer conveying direction of the second conveyance chamber, and through which an excess amount of the developer inside the development container is discharged outside.

5. An image forming apparatus comprising the developing device according to claim 1.

* * * * *